(12) United States Patent
Chenny et al.

(10) Patent No.: US 11,720,810 B2
(45) Date of Patent: Aug. 8, 2023

(54) REDUCING MEAN TIME TO FIND PROBLEMS IN ENTERPRISE INFORMATION TECHNOLOGY SYSTEMS USING BOTS

(71) Applicant: Kyndryl, Inc., New York, NY (US)

(72) Inventors: Rahul Chenny, Bangalore (IN); Ramshanker Kowta, Bangalore (IN); Awadesh Tiwari, Bangalore (IN)

(73) Assignee: Kyndryl, Inc., New York, NY (US)

( * ) Notice: Subject to any disclaimer, the term of this patent is extended or adjusted under 35 U.S.C. 154(b) by 819 days.

(21) Appl. No.: 16/106,053

(22) Filed: Aug. 21, 2018

(65) Prior Publication Data

US 2020/0065685 A1 Feb. 27, 2020

(51) Int. Cl.
| | |
|---|---|
| *G06N 5/04* | (2023.01) |
| *G06N 20/00* | (2019.01) |
| *G06F 16/28* | (2019.01) |
| *G06F 16/23* | (2019.01) |
| *G06N 5/043* | (2023.01) |

(52) U.S. Cl.
CPC ......... *G06N 5/043* (2013.01); *G06F 16/2365* (2019.01); *G06F 16/283* (2019.01); *G06N 20/00* (2019.01)

(58) Field of Classification Search
CPC .... G06N 5/043; G06N 20/00; G06F 16/2365; G06F 16/283
See application file for complete search history.

(56) References Cited

U.S. PATENT DOCUMENTS

| | | |
|---|---|---|
| 2014/0052849 A1 | 2/2014 | Sabin |
| 2016/0117505 A1 | 4/2016 | Chow et al. |
| 2017/0123887 A1 | 5/2017 | Bajaj |
| 2017/0270431 A1* | 9/2017 | Hosabettu .............. G06N 20/00 |
| 2019/0155225 A1* | 5/2019 | Kothandaraman .... G06N 20/00 |
| 2019/0171513 A1* | 6/2019 | Purushothaman ........ G06F 8/30 |

(Continued)

OTHER PUBLICATIONS

Jun Liu ("Optimal Task Ordering for Troubleshooting Systems Faults", 2005 IEEE Aerospace Conference, 2005, pp. 1-6) (Year: 2005).*

(Continued)

*Primary Examiner* — Miranda M Huang
*Assistant Examiner* — Robert Lewis Kulp
(74) *Attorney, Agent, or Firm* — Dan Housley; George S. Blasiak; Heslin Rothenberg Farly & Mesiti P.C.

(57) ABSTRACT

Embodiments describe an approach for leveraging Bots across various layers of an enterprise information technology system for reducing mean time to find problems (MTFP). The approach comprising: determining if one or more system Bots can identify one or more issues in an enterprise information technology system. Escalating the one or more issues to one or more process Bots. Invoking one or more MTFP computation engines from related Bots in communication with the one or more process Bots. Identifying the one or more issues in the enterprise information technology system by the one or more MTFP computation engines. Updating a knowledge repository with attributes of the identified one or more issues, wherein the one or more process Bots can cognitively learn from the data stored on the knowledge repository; and outputting the one or more identified issues to a user.

20 Claims, 5 Drawing Sheets

(56) References Cited

U.S. PATENT DOCUMENTS

2019/0332508 A1* 10/2019 Goyal ................. G06F 11/3414
2020/0026263 A1*  1/2020 Haberkern ............ H04L 41/147
                                                                  709/224

OTHER PUBLICATIONS

Subramaniam et al. ("COBOTS—A Cognitive Multi-Bot Conversational Framework for Technical Support Industrial Applications Track", Proc. of the 17th International Conference on Autonomous Agents and Multiagent Systems (AAMAS 2018), Jul. 10-15, 2018, pp. 597-604) (Year: 2018).*

Dmitry Khramov ("Robotic and machine learning: How to help support to process customer tickets more effectively", Thesis, Metropolia University of Applied Sciences, 12, Apr. 2018, pp. 41) (Year: 2018).*

* cited by examiner

REDUCING MEAN TIME TO FIND PROBLEMS IN ENTERPRISE INFORMATION TECHNOLOGY SYSTEMS USING BOTS

BACKGROUND OF THE INVENTION

The present invention relates generally to the field of information technology (IT) systems, and more particularly to leveraging Bots across various layers of an enterprise IT system for reducing mean time to find problems.

Growing information technology (IT) needs make it common for organizations to have thousands of nodes and/or virtual machines (VMs) deployed in hybrid mode. Despite advancements, IT systems remain fallible and need to be managed. Currently, enterprises deploy a variety of toolsets including monitoring and automation for service management to draw on a variety of benefits including uptime, efficiency, and cost savings. Once an issue or problem is reported, the support teams, drawn across multiple disciplines or service lines, must identify the precise reason leading to the problem (e.g., Mean Time to Find Problem (MTFP)) prior to attempting to fix it. With the advent of Quantum Computing, enterprise systems and sub systems will need anomalies to be dealt even faster.

SUMMARY

Embodiments of the present invention disclose a method for leveraging Bots across various layers of an enterprise information technology system for reducing mean time to find problems (MTFP). The method comprising determining, by the one or more processors, if one or more system Bots can identify one or more issues in an enterprise information technology system. Responsive to determining that the one or more system Bots cannot identify the one or more issues, escalating, by the one or more processors, the one or more issues to one or more process Bots. Invoking, by the one or more processors, one or more MTFP computation engines from related Bots in communication with the one or more process Bots. Identifying, by the one or more processors, the one or more issues in the enterprise information technology system by the one or more MTFP computation engines. Updating, by the one or more processors, a knowledge repository with attributes of the identified one or more issues, wherein the one or more process Bots can cognitively learn from the data stored on the knowledge repository, and outputting, by the one or more processors, the one or more identified issues to a user.

A computer system for leveraging Bots across various layers of an enterprise information technology system for reducing mean time to find problems (MTFP), the computer system comprising: one or more computer processors; one or more computer readable storage devices; program instructions stored on the one or more computer readable storage devices for execution by at least one of the one or more computer processors. The stored program instructions comprising program instructions to determine if one or more system Bots can identify one or more issues in an enterprise information technology system. Responsive to determining that the one or more system Bots cannot identify the one or more issues, program instructions to escalate the one or more issues to one or more process Bots. Program instructions to invoke one or more MTFP computation engines from related Bots in communication with the one or more process Bots. Program instructions to identify the one or more issues in the enterprise information technology system by the one or more MTFP computation engines. Program instructions to update a knowledge repository with attributes of the identified one or more issues, wherein the one or more process Bots can cognitively learn from the data stored on the knowledge repository, and program instructions to output the one or more identified issues to a user.

A computer program product for leveraging Bots across various layers of an enterprise information technology system for reducing mean time to find problems (MTFP), the computer program product comprising: one or more computer readable storage devices and program instructions stored on the one or more computer readable storage devices. The stored program instructions comprising program instructions to determine if one or more system Bots can identify one or more issues in an enterprise information technology system. Responsive to determining that the one or more system Bots cannot identify the one or more issues, program instructions to escalate the one or more issues to one or more process Bots. Program instructions to invoke one or more MTFP computation engines from related Bots in communication with the one or more process Bots. Program instructions to identify the one or more issues in the enterprise information technology system by the one or more MTFP computation engines. Program instructions to update a knowledge repository with attributes of the identified one or more issues, wherein the one or more process Bots can cognitively learn from the data stored on the knowledge repository, and program instructions to output the one or more identified issues to a user.

DETAILED DESCRIPTION

There is a need to improve issue detection in information technology (IT) systems. Embodiments of the present invention disclose leveraging internet robots (Bots) that act as a dedicated internet of things (IoT) device on a system to expedite identification of an issue in one or more IT systems. Additionally, theses Bots can monitor multiple layers of an IT system such as: network devices, appliances, middleware, and/or applications. Bots can be system Bots or process Bots. Bots can continuously track their system component resources (e.g. central processing unit (CPU), memory, network interface card (NIC), etc.) for their health status (e.g. disk space, utilization, input/output (I/O)).

System Bots can also collate and analyze their system data to detect and communicate anomalies to other Bots such as a process Bot. Once a Bot ascertains an issue (detected or computed), the Bot is capable of acting with accuracy on a multitude of activities including diagnosing a problem, searching a knowledgebase, attempting to fix the problem, alerting, reporting, creating a ticket, communicating to a virtual engineer, and executing a script with response status. System Bots can also integrate with local or remote monitoring agents, communicate with non-BOTs (e.g. a central console), and can be programmed for new capabilities. In various embodiments, a System Bot can be each a Bot that continuously tracks its own (internal) system components (e.g. CPU, Memory, NIC etc.) for its health status (e.g. disk space, utilization, I/O), continuously. Furthermore, system Bots can analyze their system data to detect problems and communicate anomalies to other Bots.

Embodiments of the present invention disclose a system and methodology of leveraging Bots that act as a coordinated IoT device on a system to expedite problem identification leading to minimized MTFP by solving a multi-constraint and multi-dimensional optimization problem. Bots, by design, are proactive and predictive, and therefore can identify an anomaly even before an event can occur. Additionally, in various embodiments, Bots can detect events through external monitoring tools. Alternatively, Bots can act as monitoring agents. Bots will not limit themselves to identifying a problem using pre-established methods (e.g., known historical data on issue identification) and can go beyond the known historical data to dynamically determine the features that potentially lead to the issues in an IT system. In this way, a Bots learn new ways of identifying problems. In addition to System Bots, other types of Bots cover network devices, appliances, middleware, and application. Bots may also interact with other Bots to identify problems. MTFP is the time epoch between issue occurrence and identification of the problem. MTFP computation considerations include historical MTFPs of a Bot and its current health state.

Bots can learn from other Bots, communicate with and learn from non-BOTs, and be programmed for new capabilities thereby expanding their repertoire of knowledge, via a knowledge repository, to solve new problems and existing problems more efficiently. Bots can also integrate with local or remote monitoring agents and communicate with non-Bots (e.g. a central console and/or diagnosis tools such as logical dependency on other systems). Once a Bot detects a problem, it is capable of acting on a multitude of activities directed towards problem resolution. Embodiments of the present invention can be implemented as a software, hardware or a combination of both.

A Process Bots can collaborate with other Bots or other computing sources to compute characteristics (e.g. performance of a network) or detect problems (e.g. no access to a resource necessary to complete an activity).

Process Bots can gather information from other Bots and process the information required to manage incidents and situational awareness quickly and effectively. Process Bots can perform and/or enable communication between other Bots and/or nodes by optimizing situational awareness through ongoing communications with other Process Bots, System Bots, dedicated Bots, including Bots with execution capability, and external partners or resources. Process Bots can also learn through optimizing decision making by gathering, evaluating, verifying, analyzing, categorizing and displaying incoming messages and information. Process Bots can also command and control various functions such as managing by objectives, based on an incident action plan, prioritizing, deploying and tracking critical Bots; transferring commands; determining the span of control and creating a structure to support unity of command; establishing and maintaining a common operating procedure, and other functions known in the art. Process Bots can coordinate and/or assign tasks to other Bots. Process Bots can perform the actions of any Bots known in the art, such as Command Center Bots (e.g., coordinating with other Bots during Incidents and Emergencies); Change Management Bots (e.g., identification of dependencies, and other steps in change management process); and Event Management Bots (e.g., problem resolution).

Currently, in the field of computing and/or detecting issues within programs and/or computers, issues are arising in intra systems (e.g., system detected issues and raised alarm high CPU). Other issues arising include, but are not limited to, increases in resource utilization (e.g., increase in CPU utilization due to external factors such as slow performance in network communication, storage, and/or dependent systems). Current approaches to resolve the issues stated above comprise deploying monitoring tools across system layers, system log analysis, etc.; scheduling triage meetings, war rooms, command center; contracting with vendors to manage specialized solutions and manage problem; deployment of a Service Support Desk, automation solutions triggered by monitoring tools; and/or root cause analysis. However, there are challenges in each of the current approaches. Some of the challenges that arise during the current approaches to resolve problems within the art comprise, but are not limited to, inefficiency in processing data/information and/or process flow; excessive human involvement; "silo" approach; and/or other factors such as multi-vendor environments to address issues, which cause issues to arise when one or more problems span across vendors, servers, and/or nodes causing a lack of ownership; and/or expensive consultants.

Additionally, inefficiency in processes is a challenge to current approaches to remedy issues in the art, such as enterprises adopting a number of mechanisms to uncover and subsequently resolve issues including assignment to one or more default groups (e.g., platform or server group, who based on their understanding assign it to the likely group), or early diagnosis by a designated dispatcher, who then assigns it to the likely group. If inaccurate, the ticket gets bounced from one group to another at the cost of impacting resolution time SLAs, and if contractually bound could result in financial penalties. Another example of inefficiency is pressure to act quickly and effectively in identifying the actual issue versus the reported issue (e.g., a slowness in the network (actual issue) could be reported as a performance issue). Excessive human involvement impacts Mean Time to Repair (MTTR) which establishes relation between time it took to fix the problem from the time the problem was identified and MTFP owing to effort involved (standard operating procedures (SOP) activities) and accuracy of diagnosis, which might result in service level agreement (SLA) related penalties, and can result in increased downtimes leading to business impacts, causing issues in current remedy approaches. The SLA establishes time to resolve the problem and time to respond to the customer report, SLAs are part of contract and affect the payments for parties involved.

The "Silo" approach can be a variety of tools that are deployed to cover different layers (e.g. infrastructure, middleware, applications), in which it takes a triage and multiple meetings of owners to work together to uncover and confirm the issue. Bots across various layers of an IT system, provide social media-like interactive platform to the user in order to "zero-in" on a problem with accuracy. For example, if issues arise out of password reset, a user may be clueless if it is due to application instability or problem with an infrastructure. When the user is able to decode that problem is with the infrastructure, then the next challenge becomes deciding which group the ticket should be assigned (e.g., should the ticket be assigned to network (N/W) team or should it be assigned to storage team etc.). Embodiments of the present invention can build Bots at each layer on a common platform such as "interacting and communicating IT Bots." System and processing Bots interact and share the context as well as information related to the user problems thereby improving the efficiency of enterprise IT systems art.

Embodiments of the present invention improve the art of enterprise IT systems by creating more efficient and accurate solutions to locating issues in enterprise IT systems based on the use of Bots, both system Bots and process Bots. Documentation of information received, and response steps taken include incident logs; response actions; bots and other resources used; timeline of activities; and/or any other documentation know in the art.

Figure 1:
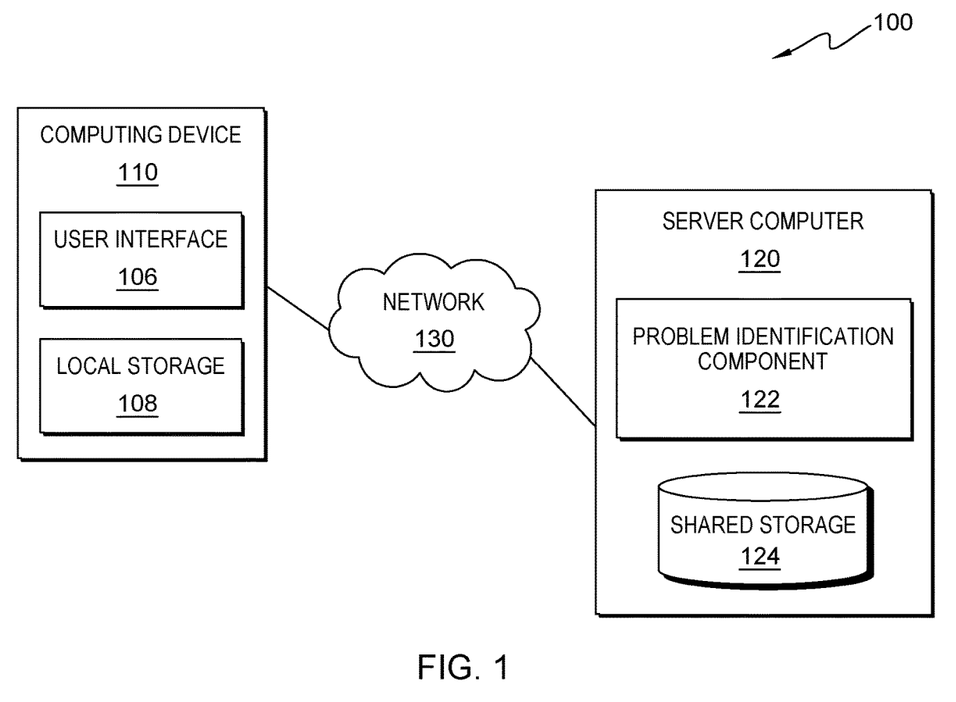
FIG. 1 is a functional block diagram illustrating a distributed data processing environment, in accordance with an embodiment of the present invention.

Turning now to FIG. 1, Distributed data processing environment 100 includes computing device 110 and server computer 120 interconnected over network 130. Network 130 can be, for example, a telecommunications network, a local area network (LAN), a wide area network (WAN), such as the Internet, a wireless technology for exchanging data over short distances (using short-wavelength ultra-high frequency (UHF) radio waves in the industrial, scientific and medical (ISM) band from 2.4 to 2.485 GHz from fixed and mobile devices, and building personal area networks (PANs) or a combination of the three, and can include wired, wireless, or fiber optic connections. Network 130 can include one or more wired and/or wireless networks that are capable of receiving and transmitting data, voice, and/or video signals, including multimedia signals that include voice, data, text and/or video information. In general, network 130 can be any combination of connections and protocols that will support communications between computing device 110 and server computer 120, and any other computing devices (not shown in FIG. 1) within distributed data processing environment 100.

In various embodiments, computing device 110 can be, but is not limited to, a standalone device, a server, a laptop computer, a tablet computer, a netbook computer, a personal computer (PC), a smart phone, a desktop computer, a smart television, a smart watch, a radio, stereo system, a cloud based service (e.g., a cognitive cloud based service), and/or any programmable electronic computing device capable of communicating with various components and devices within distributed data processing environment 100, via network 130 or any combination therein. In general, computing device 110 can be representative of any programmable mobile device or a combination of programmable mobile devices capable of executing machine-readable program instructions and communicating with users of other mobile devices via network 130 and/or capable of executing machine-readable program instructions and communicating with server computer 120. In other embodiments, computing device 110 can represent any programmable electronic computing device or combination of programmable electronic computing devices capable of executing machine readable program instructions, manipulating executable machine-readable instructions, and communicating with server computer 120 and other computing devices (not shown) within distributed data processing environment 100 via a network, such as network 130. Computing device 110 includes an instance of user interface 106. Computing device 110 and user interface 106 allow a user to interact with problem identification component (PIC) 122 in various ways, such as sending program instructions, receiving messages, sending data, inputting data, editing data, correcting data and/or receiving data. In various embodiments, not depicted in FIG. 1, computing device 110 can have one or more user interfaces. In other embodiments, not depicted in FIG. 1 environment 100 can comprise one or more computing devices (e.g., at least two).

User interface (UI) 106 provides an interface to PIC 122 on server computer 120 for a user of computing device 110. In one embodiment, UI 106 can be a graphical user interface (GUI) or a web user interface (WUI) and can display text, documents, web browser windows, user options, application interfaces, and instructions for operation, and include the information (such as graphic, text, and sound) that a program presents to a user and the control sequences the user employs to control the program. In another embodiment, UI 106 can also be mobile application software that provides an interface between a user of computing device 110 and server computer 120. Mobile application software, or an "app," is a computer program designed to run on smart phones, tablet computers and other mobile devices. In an embodiment, UI 106 enables the user of computing device 110 to send data, input data, edit data (annotations), correct data and/or receive data.

Server computer 120 can be a standalone computing device, a management server, a web server, a mobile computing device, or any other electronic device or computing system capable of receiving, sending, and processing data. In other embodiments, server computer 120 can represent a server computing system utilizing multiple computers as a server system, such as in a cloud computing environment. In another embodiment, server computer 120 can be a laptop computer, a tablet computer, a netbook computer, a personal computer (PC), a desktop computer, a personal digital assistant (PDA), a smart phone, or any other programmable electronic device capable of communicating with computing device 110 and other computing devices (not shown) within distributed data processing environment 100 via network 130. In another embodiment, server computer 120 represents a computing system utilizing clustered computers and components (e.g., database server computers, application server computers, etc.) that act as a single pool of seamless resources when accessed within distributed data processing environment 100. Server computer 120 can include internal and external hardware components, as depicted, and described in further detail with respect to FIG. 5.

Each of shared storage 124 and local storage 108 can be a data/knowledge repository and/or a database that can be written to and/or read by one or a combination of PIC 122, server computer 120 and/or computing device 110. In the depicted embodiment, local storage 108 resides on computing device 110. In the depicted embodiment, shared storage 124 resides on server computer 120. In another embodiment, shared storage 124 can reside elsewhere within distributed data processing environment 100 provided coverage assessment program 110 has access to shared storage 124. Shared storage 124 and/or local storage 108 can be implemented with any type of storage device capable of storing data and configuration files that can be accessed and utilized by server computer 120, such as a database server, a hard disk drive, or a flash memory. In other embodiments, shared storage 124 and/or local storage 108 can be hard drives, memory cards, computer output to laser disc (cold storage), and/or any form of data storage known in the art.

In some embodiments, shared storage 124 and/or local storage 108 can be cloud storage systems and/or databases linked to a cloud network. In various embodiments, PIC 122 can search, identify, match, and/or retrieve historic information of issues that have been fixed and/or identified previously from a knowledge repository (e.g., shared storage 124 and/or local storage 108). For example, PIC 122 will search and/or store the features and/or symptoms related to the issue to shared storage 124, which PIC 122 can access at a later time to determine a problem in an IT system. In this particular example, PIC 122 can create a database based on collected information from previously identified issues. In various embodiments, the knowledge repository enables PIC 122 and all Bots associated with PIC 122 to be self-learning.

BOTs throughout various layers of IT systems provide a social media-like interactive platform to the user to accurately "zero-in" on problems. For example, if issues arise with a password reset, a user may not be able to determine whether it is due to application instability or an infrastructure problem. Once the user determines the problem is with infrastructure, then which group to assign the ticket to is the next challenge (N/W team or Storage team, etc.). In various embodiments, PIC 122 can be located on one or more layers of an enterprise IT system on a common platform such as interacting and communicating IT Bots, these Bots interact and share the context as well as information related to the user problems. In various embodiments, MTFP can be defined as the time difference between an issue being reported and the time when the issue is detected (e.g., the time (T2) when a problem is detected minus the time (T1) when the issue is first reported), depicted in Equation 1. Alternatively, in more complex scenarios, MTFP can be defined as the time (T1) when the issue was first reported, and the time (T2) at which one or more Bots that can identify the problem were identified.

$$MTFP = T2 - T1 \qquad \text{Equation 1}$$

In various embodiments, PIC 122 can command the different types of Bots known in the art to communicate and interact with one another. In various embodiments, PIC 122 can enable interaction between Bots on different layers (e.g., application layer, middleware layer, and infrastructure layer). In some embodiments, PIC 122 can instruct system Bots to act as process Bots, unless the system Bot fails to identify the problem on its own. In various embodiments, PIC 122 can direct one or more process Bots to compute one or more cumulative scores for current and/or predictive probable scores, in which each Bot can execute one or more tasks to find one or more problems in an enterprise system. In one particular embodiment, based on the cumulative score and accuracy of MTFP in the past and/or current health of the Bots, PIC 122 can run one or more optimizations that trigger, initiate, and/or assign one or more signals to latch to one or more system Bots for a particular scenario.

In various embodiments, Bots continuously scan system components to identify deviations or anomalies using self-diagnostics. In some embodiments, PIC 122 enables Bots to continuously scan for issues. For example, if a Bot identifies an anomaly, PIC 122 instructs one or more system Bots to access one or more knowledge repositories (e.g., shared storage 124 and/or local storage 108), wherein the one or more system Bots can identify parameters of the anomaly and compute criticality, as it is known in the art, which enables the one or more system Bots to execute problem detection. In this particular embodiment, the one or more system Bots can interact with one or more process Bots and transfer context, data, and control to the one or more process Bots, in which PIC 122 enables the one or more process Bots to access one or more knowledge repositories in order to identify the one or more problems responsible for the detected anomaly. In this particular embodiment, the one or more process Bots can recruit other Bots (system bots, process bots, or bot) and orchestrate alternative actions to identify the one or more problems in the IT system.

In various embodiments, an anomaly in the form of an "alert" would be generated (or detected) by PIC 122, e.g., if the free space on a hard drive is below and/or above a predetermined threshold. In this particular embodiment, PIC 122 would attempt to find the problem prior to correcting the issue either by itself or with the help of other Bots. For example, a system Bot attempts to find an internal problem. In this particular example, the system bot will attempt to identify the problem using its knowledge base (data retrieved from one or more knowledge repositories) and invoke disk APIs or commands. The system bot runs a "command" that returns the total free space, which will enable it to confirm the problem and calculate the MTFP. Next, the problem resolution steps would follow.

In this particular example, the system Bot is unable to verify the problem/issue and therefore shares the symptoms data (e.g., attributes of the issue), context, and control with the process Bot. It would include information that a remote invocation is leading to the disk space issue. The process Bot will ascertain from its knowledgebase prioritized problem detection approaches based on factors noted in. In the given scenario, the process Bot could invoke a dependency mapper to construct the systems that interact with the affected system Bot. Furthermore, the interaction with the other system Bots can help ascertain that a failed business service is contributing to excessive writes on the affected system leading to reduced disk space. In this case the MTFP is computed from the time the alert was raised to the time the failed business service was detected.

In another example, an online buyer is selecting product by clicking "add to cart" for the product under the buyer's account, PIC 122 takes an intermediate step to determine, from an inventory management system (IMS), if the product is in inventory. In this scenario, the "Add to cart" operation entails many activities; however, the scenario below focuses on 2 steps (e.g., checking inventory for availability through an IMS and adding the product identifier to the Order Management System(cart)). The Bot on the Commerce Content Server can play a dual role as a system Bot and as a process Bot. As a process Bot, the Bot identifies and communicates which systems engage for the above scenario. In some embodiments, a user can interact with one or more Bots, either system or process, in a network and/or system via UI 106.

In one particular embodiment, the communication between the process Bot and System Bot described above helps the other system Bots learn or relearn the context of a topic (e.g., business) during the interaction and recalibrate themselves to meet the stated SLAs, e.g., transaction time of 3 seconds. In this scenario, inventory checks can be done via either the server IMS1 or the server IMS2. In various embodiments, a Process Server asks each of the inventory systems to calculate its expected response time. In one embodiment, IMS1 is compliant to the performance goals, IMS2 is unable to meet the response time based on a problem. This will trigger the process of flow of the Bots described above. In this particular scenario, if a system Bot, which in this case is IMS2, is unreachable, another Bot can communicate its last broadcasted status (including its issue if available) and notify the Process Bot. The process Bot can generate an associated ticket, if required. In this particular example, a knowledgebase of each Bot, via a knowledge repository (e.g., local storage 108 and/or shared storage 124), is refreshed in every interaction using machine learning process.

In various embodiments, PIC 122 can leverage Bots across various layers of an enterprise information technology system for reducing MTFP. In various embodiments PIC 112 can reduce MTFP by enabling Bots to learn from other Bots, wherein the learning comprises: communicating and learning from non-BOTs, wherein non-BOTs and Bots can be programmed for new capabilities thereby expanding its known repertoire of knowledge to solve new problems and existing problems more accurately; developing cognitive dynamic identifier, dynamic transfer function for updating one or more Bot brain stores and making the Bots to a near-zero manual intervention to execute the problem identification; enabling the Bots to learn, relearn and recalibrate the business contexts automatically online and establish new baseline for SLA, dynamically; and outputting the identification of one or more problems in an enterprise information technology system in a reduced time.

In various embodiments, PIC 122 enables Bots to cognitively work together and interact with one another to identify, determine, and/or predict an issue within one or more IT systems. Additionally, an embodiment of cognitive dynamic system identifier (CDSI) and decision optimization is explained below with reference to FIG. 3.

For example, a process Bot is instructed to be the decision-making Bot and selects the best qualified Bot, using predetermined metrics. In this particular example, the process Bot retrieves historical from a knowledge repository and stores real time data to a knowledge repository. In this particular example, the process Bot retrieves data on the reported and/or identified issue and/or to retrieve an accuracy score, wherein accuracy score pertains to value and performance of BOT that has earlier identified and resolved the problem. In this particular example, the process Bot uses a cumulative score calculator and accuracy score to identify the problem in the IT system. In this particular example, the process Bot uses optimizer "Optimizer: Minimize MTFP/BOT", Maximize Score, ability to meet SLAs and Selector Logic and Trigger Signal to initiate and assign other Bots tasks to assist in identifying the issue (e.g., Bot1 MTFP_B1, Bot2 MTFP_B2 . . . Botn MTFP_Bn)."

Furthermore, CDSI and decision optimization can utilize historical and real time data to identify an issue in an IT system. In various embodiments, CDSI can calculate real time data, via programmatic logic. In various embodiments, when no event is reported the issue in the IT system is identified by an early warning of a probable anomaly multiplied by the probable issue minus the attribute.

Figure 2:
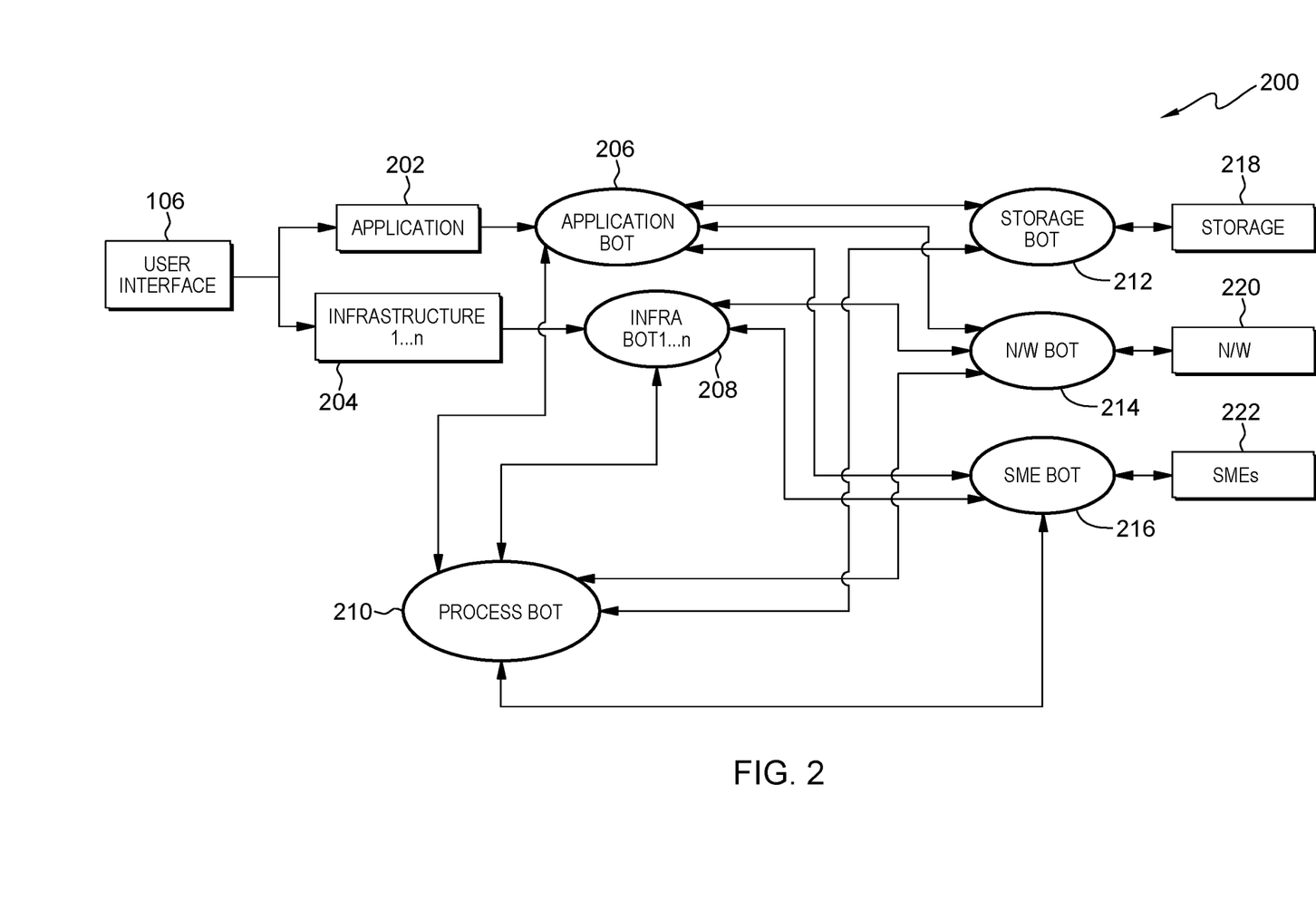
FIG. 2 illustrates an example of a flow diagram of a problem identification component, on a server computer within the distributed data processing environment of FIG. 1, in accordance with an embodiment of the present invention.

FIG. 2 illustrates an example of a flow diagram of PIC 122, on server computer 120 within the distributed data processing environment 100 of FIG. 1. FIG. 2 provides an illustration of one implementation and does not imply any limitations with regard to the environments in which different embodiments can be implemented. Many modifications to the depicted environment can be made by those skilled in the art without departing from the scope of the invention as recited by the claims.

In various embodiments, FIG. 2 depicts one example how PIC 122 enables Bots to interact with one another in order to identify a problem in an IT system. In various embodiments, a user can interact with application 202 and/or infrastructure 204, via UI 106. Application 202 can be a mobile application, internet application, computer application, and/or any application known in the art. Infrastructure 204 can be an enterprise's entire collection of hardware, software, networks, data centers, facilities and related equipment used to develop, test, operate, monitor, manage and/or support information technology services (e.g., server computer 120). In various embodiments, infrastructure 204 can be one or more infrastructures that are linked together and/or communicating with each other (e.g., infrastructure 1, infrastructure 2, infrastructure 3, . . . infrastructure n). In this particular embodiment, PIC 122 enables communication between application 202 and application Bot 206 and/or enables communication between infrastructure 1 . . . n 240 and infrastructure Bot 208. Application Bot 206 is a Bot that operates on the application level and infrastructure Bot 208 is a Bot that operates on the infrastructure level. In various embodiments, infrastructure Bot 208 can be one or more Bots located and/or communicating with infrastructure 204 (e.g., infrastructure Bot 1, infrastructure Bot 2, infrastructure Bot 3, . . . infrastructure Bot n). In this particular embodiment, PIC 122 enables communication between application Bot 206, storage Bot 212, network (N/W) Bot 214, service management enterprise (SME) Bot 216, and/or process Bot 210. In this particular embodiment, PIC 122 enables communication between infrastructure Bot 208, storage Bot 212, network (N/W) Bot 214, service management enterprise (SME) Bot 216, and/or process Bot 210. Storage Bot 212 can be one or more Bots that communicate, monitor and/or are positioned on the storage level of an IT system and are in direct communication with, or are monitoring, storage 218. Storage 218 can be shared storage 124 and/or local storage 108. N/W Bot can be one or more Bots communicating, monitoring and/or positioned on the network level and is in direct communication and/or monitoring of NAY 220.

A network comprises multiple devices that communicate with one another. While a traditional network is comprised of desktop computers, modern networks may include laptops, tablets, smartphones, televisions, gaming consoles, smart appliances, and other electronics. Many types of networks exist, but they fall under two primary categories: LANs and WANs. SME Bot 216 is a Bot that can be one or more Bots communicating, monitoring and/or positioned on the SME's level, and may be in direct communication with, or monitoring, SMEs 222. SME is a category of business management software, typically a suite of integrated applications that a service organization uses to capture, manage, save and analyze data critical to their service business performance. In this particular embodiment, PIC 122 enables process Bot 210 to command/control and enable communication between process Bot 210 and all the Bots in environment 200 (e.g. application Bot 206, infrastructure Bot1 . . . n 208, storage Bot 212, NAY Bot 214, and/or SME Bot 216). Generally, FIG. 2 demonstrates one example of the communication flow of Bots in an IT system.

Figure 3:
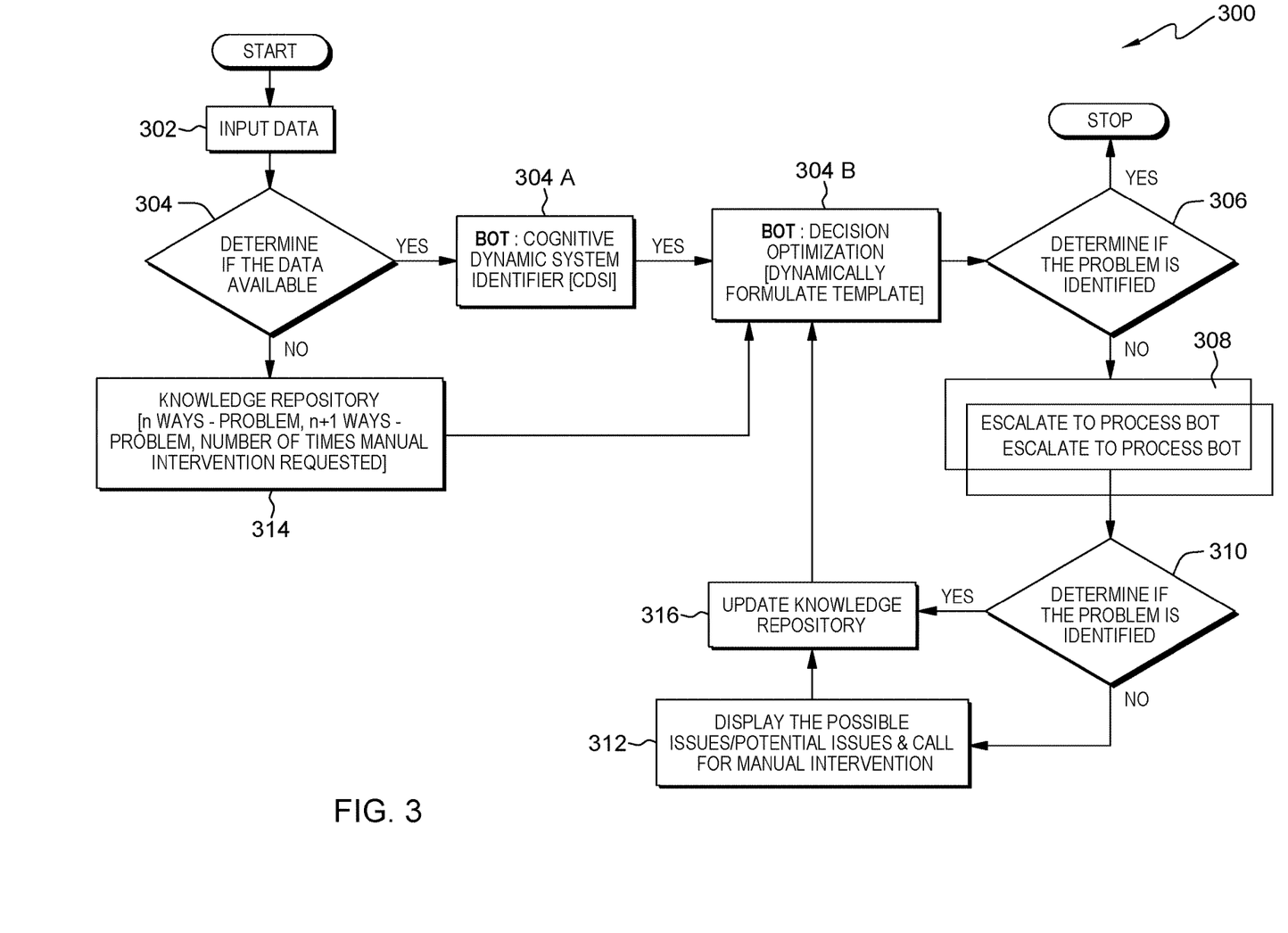
FIG. 3 depicts operational steps of the problem identification component for problem identification, on the server computer within the distributed data processing environment of FIG. 1, in accordance with an embodiment of the present invention.

FIG. 3 depicts operational steps of PIC 122 for problem identification, server computer 120 within distributed data processing environment 100 of FIG. 1, in accordance with an embodiment of the present invention. FIG. 3 provides an illustration of one implementation and does not imply any limitations with regard to the environments in which different embodiments can be implemented. Many modifications to the depicted environment can be made by those skilled in the art without departing from the scope of the invention as recited by the claims. In general, FIG. 3 depicts one example of the cognitive flow for each Bot.

In step 302, PIC 122 enables data input into computing device 110, server computer 120, and/or an IT system, via UI 106. In various embodiments, a user and/or a Bot can input data (e.g., monitoring system data, event data, log data, incident data, time series data, etc.) into computing device 110, server computer 120, IT system, another Bot, etc. In various embodiments, the input data received by PIC 122 can be stored on local storage 108, and/or shared storage 124 by one or more Bots and can be accessed at a later time.

In step 304, PIC 122 determines if the data is available to one or more Bots. Examples of available data are high memory usage include inconsistent garbage collection, high CPU temperature, and/or missing data, etc.. In this particular embodiment, if PIC 122 determines that the data is available (Yes step) to one or more Bots then PIC 122 enables the one or more Bots to undergo, step 304 A, a cognitive dynamic system identifier (CDSI). In step 304 B, PIC 122 enables one or more Bots to perform one or more decision optimization to dynamically formulate one or more templates. In various embodiments, a Bot can perform one or more decision optimization to dynamically formulate one or more templates to identify features of the detected and/or reported issue. For example:
Features: Problem Identifiers
Slow Application performance Probability of shut down
Incorrect computations
Features: attributes
Slow transaction Probability of shut down
Weight Optimizing parameters:
Transaction per second, rate of garbage collection, network speed In various embodiments, if PIC 122 determines that the data is not available to one or more Bots (No step) then PIC 122 can advance to step 314 before going to step 304 B.

In step 306, PIC 122 determines if the problem is identified. In various embodiments, PIC 122 can determine if one or more problems have been identified by the one or more Bots in the IT system. In this particular embodiment, if PIC 122 determines that the one or more Bots in the IT system have identified the problem in the IT system (Yes step) then PIC 122 can instruct the Bots to stop searching for the problem. For example, using the identified features and attributes above, the Bot determines the issue is an infinite loop in the application and confirms this by using a smoke test, as it is known in the art. However, if PIC 122 determines that the one or more Bots in the system did not identify the problem in the IT system (No step) then PIC 122 can advance to step 308 and escalate the problem into a ticket. In various embodiments, one or more process Bots can attempt one or more possible methods to identify the problem in an IT system and/or retrieve/locate additional available features from CDSI. Additionally, in this particular embodiment, process Bots can perform dynamic transfer function models that form on-the-fly relationships among parameters and generate an exponential function (e.g., $x^2$, $x^3$, ... $x^N$) as a problem. It should be noted that features can be attributes derived from data, e.g., rate of memory utilization, rate of accumulation of garbage, number of local threads, number of loops, and/or any other attributes derived from data known in the art.

In step 308, PIC 122 can escalate the issue into a ticket and/or forward the issue to a process Bot. In various embodiments, PIC 122 can escalate one or more issues into one or more tickets and/or forward the one or more issues to one or more process Bots. In other embodiments, PIC 122 creates a ticket and escalates the issue a user is experiencing to a process Bot to identify the root cause of the problem for the user. In this particular embodiment, the process Bot can store the data pertaining to the problem on local storage 106, and/or shared storage 124.

In step 310, PIC 122 determines if the problem is identified by the process Bot. In various embodiments, PIC 122 can determine if one or more problems have been identified by the one or more Bots in the IT system. In this particular embodiment, if PIC 122 determines that the one or more process Bots in the IT system have identified the problem in the IT system (Yes step) then PIC 122 can advance to step 316, in which PIC 122 instructs the one or more process Bots to update the knowledge repository (e.g., local storage 106 and/or shared storage 124) with the details and/or features of the reported problem and/or solution to the reported problem.

If PIC 122 determines that the one or more process Bots in the IT system have not identified the problem (No, step 310), then in step 312, PIC 122 displays the potential issues and requests manual intervention from a user. In various embodiments, PIC 122 can instruct one or more process Bots to report one or more possible issues to be displayed to a user. In this particular embodiment, the one or more process Bots were instructed to report all the possible issues to PIC 122. In this particular embodiment, PIC 122 can update the knowledge repository with one or more of the reported possible issues and advance to step 316 and step 304 B.

In step 314, PIC 122 retrieves data from a knowledge repository. In various embodiments, PIC 122 can retrieve data that was not available during step 304 from a knowledge repository to assist in identifying the reported issue and/or to retrieve information about the reported issue. In step 316, PIC 122 updates the knowledge repository with the data recorded during the identification process of the reported issue. The data can be historical data and/or real time data.

Figure 4:
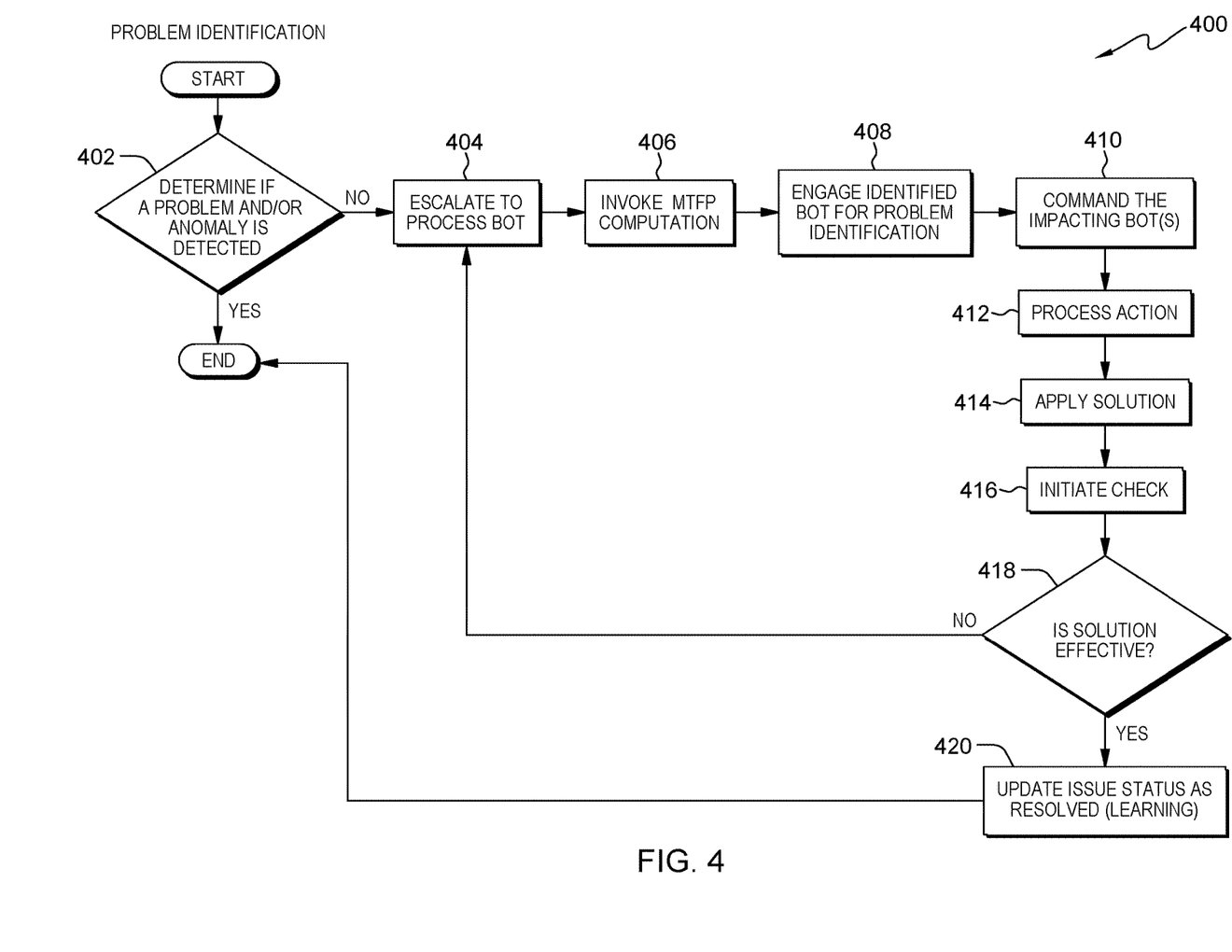
FIG. 4 illustrates operational steps of the problem identification component for problem identification and problem resolution, on the server computer within the distributed data processing environment of FIG. 1, in accordance with an embodiment of the present invention.

FIG. 4 illustrates operational steps of a PIC 122 for problem identification and problem resolution, on server computer 120 within the distributed data processing environment 100 of FIG. 1, in accordance with an embodiment of the present invention. FIG. 4 provides an illustration of one implementation and does not imply any limitations with regard to the environments in which different embodiments can be implemented. Many modifications to the depicted environment can be made by those skilled in the art without departing from the scope of the invention as recited by the claims.

In step 402, PIC 122 determines if a problem and/or anomaly is detected. In various embodiments, PIC 122 can control and/or communicate with a process Bot to determine if the system Bot is able to identify one or more issues and/or anomalies on its own. In this particular embodiment, if one or more system Bots are unable to identify the one or more issues and/or anomalies (No step) then PIC 122 can advance to step 404. However, if the one or more system Bots are able to identify the one or more issues and/or anomalies then PIC 122 can display the results to the user and end the process. In some embodiments, PIC 122 can update the database before ending and propose strategies to the user to prevent the issue from reoccurring. In various embodiments, PIC 122 determines if an issue and/or anomaly is detected. In various embodiments, PIC 112 determining if an issue or anomaly is detected comprises: enabling one or more Bots to undergo CDSI, and one or more Bots to perform one or more decision optimization to dynamically formulate one or more templates, in which one or more Bots can perform one or more decision optimization to dynamically formulate one or more templates to identify features of the detected and/or reported issue.

In step 404, PIC 122 escalates the issue to a process Bot. In various embodiments, if one or more system Bots are unable to identify the issue then PIC 122 can escalate the issue to one or more process Bots. In one particular embodiment, PIC 122 can create a ticket for the detected and/or reported issue and escalate the issue to one or more process Bots. In various embodiments, when an issue is escalated to one or more process Bots, the process Bots can act as command center Bots (e.g., coordinate with other Bots). In step 406, PIC 122 invokes MTFP computation engine from related Bots. In various embodiments, PIC 122 can utilize the MTFP computation engine to determine which Bots are relevant in identifying the one or more issues and/or anomalies based on a predetermined threshold. In step 408, PIC 122 engages the identified Bot for issue identification. In various embodiments, PIC 122 can engage the one or more identified Bots to be utilized in identifying the one or more issues. In various embodiments, the one or more identified Bots report the identified issues to the one or more process Bots. In various embodiments, PIC 122 can display and/or output the one or more identified issues and/or anomalies to a user via UI 106 and/or via messaging (e.g., text, email, phone call, voicemail, etc.)

In step 410, PIC 122 enables the process Bot to command the impacting/relative Bots. In various embodiments, PIC 122 enables one or more process Bots to command one or more impacting/relative Bots toward determining one or more resolutions to the identified issue and/or anomaly. In various embodiments, PIC 122 can display and/or output the one or more identified solutions to the issue and/or anomaly to a user via UI 106 and/or via messaging (e.g., text, email, phone call, voicemail, etc.). In step 412, PIC 122 performs a process action. In various embodiments, a process action is an action where one or more process BOTs detect there are one or more issues but are unable to identify at least one of the issues, thus triggering an enable logic function and contacting other BOTs, wherein the process action runs its own model to identify which BOT can identify the issue per SLA and initiate a process of assigning the detection/identification task to the identified BOT. In various embodiments, PIC 122 enables and/or instructs one or more process Bots to perform one or process actions.

In step 414, PIC 122 applies the solution. In various embodiments, PIC 122 can apply the one or more identified solutions to the one or more issues and/or anomalies identified in the IT system. In some embodiments, PIC 122 can display a prompt to the user requesting permission to apply the one or more solutions. In other embodiments, a user can enable PIC 122 to operate independently and apply the one or more solutions automatically. In step 416, PIC 122 initiates a check of the solution. In various embodiments, PIC 122 instructs one or more process Bots to initiate a check of the implemented one or more solutions to ensure the one or more solutions are correcting the identified one or more issues and/or anomalies and/or if the one or more solutions were properly implemented.

In step 418, PIC 122 determines if the solution is effective. In various embodiments, PIC 122 communicates with the one or more process Bots to determine if the one or more implemented solutions are effective in correcting the one or more identified issues/anomalies. In this particular embodiment, if PIC 122 determines that the one or more implemented solutions is not effective (No step) then PIC 122 can repeat steps 404-418 until a permanent and/or effective solution is identified. However, in this particular embodiment, if PIC 122 determines that the one or more implemented solutions is effective (Yes step) then PIC 122 can advance to step 420.

In step 420, PIC 122 updates the knowledge repository. In various embodiments, PIC 122 can update one or more knowledge repositories (e.g., local storage 108 and/or shared storage 124) with the attributes of the identified problem and the effective solution(s). In various embodiments, if a ticket is created the PIC 122 can update the issue status of the created ticked. In various embodiments, PIC 122 can learn from the data stored in the knowledge repository. In this particular embodiment, steps 402-410 are directed to problem identification in an IT system using Bots and steps 412-420 are directed to problem resolution of the identified problem(s) using Bots.

Figure 5:
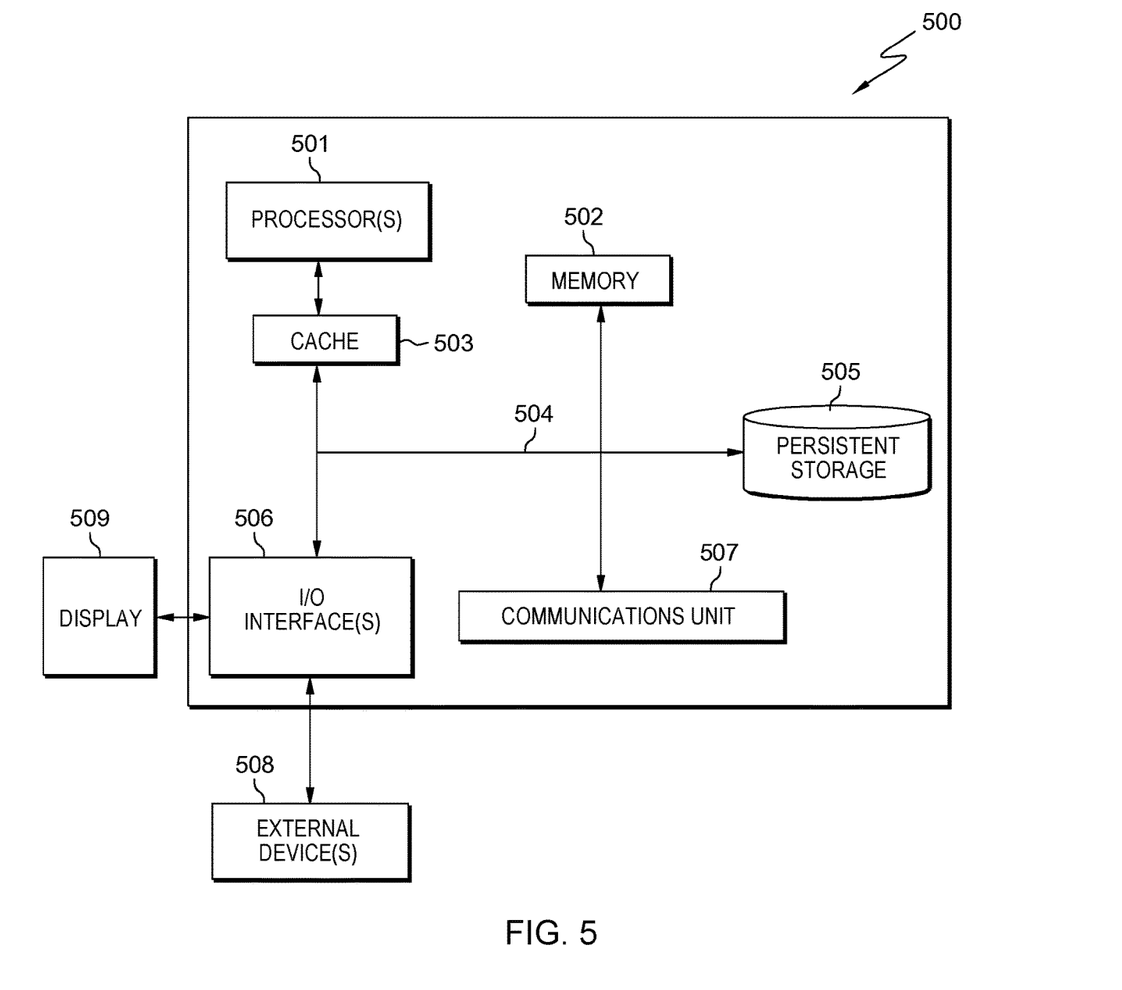
FIG. 5 depicts a block diagram of components of the server computer executing the problem identification component within the distributed data processing environment of FIG. 1, in accordance with an embodiment of the present invention.

FIG. 5 depicts computer system 500, where server computer 120 represents an example of computer system 500 that includes PIC 122. The computer system includes processors 501, cache 503, memory 502, persistent storage 505, communications unit 507, input/output (I/O) interface(s) 506 and communications fabric 504. Communications fabric 504 provides communications between cache 503, memory 502, persistent storage 505, communications unit 507, and input/output (I/O) interface(s) 506. Communications fabric 504 can be implemented with any architecture designed for passing data and/or control information between processors (such as microprocessors, communications, and network processors, etc.), system memory, peripheral devices, and any other hardware components within a system. For example, communications fabric 504 can be implemented with one or more buses or a crossbar switch.

Memory 502 and persistent storage 505 are computer readable storage media. In this embodiment, memory 502 includes random access memory (RAM). In general, memory 502 can include any suitable volatile or non-volatile computer readable storage media. Cache 503 is a fast memory that enhances the performance of processors 501 by holding recently accessed data, and data near recently accessed data, from memory 502.

Program instructions and data used to practice embodiments of the present invention can be stored in persistent storage 505 and in memory 502 for execution by one or more of the respective processors 501 via cache 503. In an embodiment, persistent storage 505 includes a magnetic hard disk drive. Alternatively, or in addition to a magnetic hard disk drive, persistent storage 505 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 505 can also be removable. For example, a removable hard drive can be used for persistent storage 505. Other examples include optical and magnetic disks, thumb drives, and smart cards that are inserted into a drive for transfer onto another computer readable storage medium that is also part of persistent storage 505.

Communications unit 507, in these examples, provides for communications with other data processing systems or devices. In these examples, communications unit 507 includes one or more network interface cards. Communications unit 507 can provide communications through the use of either or both physical and wireless communications links. Program instructions and data used to practice embodiments of the present invention can be downloaded to persistent storage 505 through communications unit 507.

I/O interface(s) 506 enables for input and output of data with other devices that can be connected to each computer system. For example, I/O interface 506 can provide a connection to external devices 508 such as a keyboard, keypad, a touch screen, and/or some other suitable input device. External devices 508 can also include portable computer readable storage media such as, for example, thumb drives, portable optical or magnetic disks, and memory cards. Software and data used to practice embodiments of the present invention can be stored on such portable computer readable storage media and can be loaded onto persistent storage 505 via I/O interface(s) 506. I/O interface(s) 506 also connect to display 509.

Display 509 provides a mechanism to display data to a user and can be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention can be a system, a method, and/or a computer program product. The computer program product can include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general-purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, a segment, or a portion of instructions, which comprises one or more executable instructions for implementing the specified logical function(s). In some alternative implementations, the functions noted in the blocks can occur out of the order noted in the Figures. For example, two blocks shown in succession may, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for leveraging Bots across various layers of an enterprise information technology system for reducing mean time to find problems (MTFP), the method comprising:
    determining, by one or more processors, if one or more system Bots can identify one or more issues in an enterprise information technology system;
    responsive to determining that the one or more system Bots cannot identify the one or more issues, escalating, by the one or more processors, the one or more issues to one or more process Bots;
    invoking, by the one or more processors, one or more MTFP computation engines from related Bots in communication with the one or more process Bots;
    identifying, by the one or more processors, the one or more issues in the enterprise information technology system, and further identifying at least one relevant related Bot of the related Bots, by the invoking of the one or more MTFP computation engines from the related Bots in communication with the one or more process Bots, and commanding the at least one relevant related Bot to determine at least one resolution to the one or more issue in the enterprise information technology system, wherein the at least one relevant related Bot has been determined to be relevant to the identifying the one or more issues in the enterprise information technology system;
    updating, by the one or more processors, a knowledge repository with attributes of the identified one or more issues based on attribute data of the at least one relevant related Bot, wherein the one or more process Bots cognitively learn from data stored on the knowledge repository;
    outputting, by a user interface, the one or more identified issues to a user; and performing, by the one or more process Bots, a process action, wherein the process action runs an independent model to identify which Bot of the related Bots can identify a certain issue per a service level agreement (SLA) and initiate a process of assigning an identification task for identifying the certain issue to the identified Bot of the related Bots, wherein the one or more system Bots continuously tracks its internal system components for its health status, wherein the method includes determining that memory usage data is available to the one or more process Bots, wherein the memory usage data includes inconsistent garbage collection, high CPU temperature, and/or missing data, and responsively to determining that memory usage data is available to the one or more process Bots performing one or more decision optimizations to dynamically formulate templates to features of a detected and/or reported issue, wherein the features of the detected and/or reported issue include (i) application speed, (ii) probability of shut down, (iii) incorrect computations, (iv) transaction speed.

2. The method of claim 1 further comprising:
    identifying, by the one or more processors, one or more solutions to the identified one or more issues; wherein identifying one or more solutions comprises retrieving solution data from the knowledge repository relative to the attributes of the identified one or more issues; and
    applying, by the one or more processors, the identified one or more solutions to the identified one or more issues.

3. The method of claim 2 further comprising:
    initiating, by the one or more processors, a check to determine whether the applied one or more solutions are effective in correcting the one or more issues.

4. The method of claim 3 further comprising:
    response to determining that the applied one or more solutions are effective in correcting the one or more issues, updating, by the one or more processors, the knowledge repository with the identified one or more solutions.

5. The method of claim 1 wherein the determining further comprises:
    enabling, by the one or more processors, the one or more process Bots to perform one or more decision optimization to dynamically formulate one or more templates, in which the one or more process Bots can perform one or more decision optimization to dynamically formulate one or more templates to identify features of the detected issue.

6. The method of claim 1 wherein the one or more process Bots perform one or more of the following actions selected from the group consisting of: (a) learning through optimizing decision making by gathering, evaluating, verifying, analyzing, categorizing and displaying incoming messages and information, (b) the command and control function of managing objectives based on an incident action plan, (c) the command and control function of prioritizing, deploying and tracking critical Bots, (d) the command and control function of transferring commands, (e) the command and control function of determining a span of control and creating a structure to support unity of command, (f) the command and control function of establishing and maintaining a common operating procedure; (g) coordinating and/or assigning tasks to other Bots, (h) functioning as a Command Center Bot to coordinate with other Bots during Incidents and Emergencies, (i) functioning as a Change Management Bot to perform identification of dependencies, and (j) functioning as an Event Management Bot to perform problem resolution.

7. The method of claim 1 wherein the one or more process Bots perform each of: (a) learning through optimizing decision making by gathering, evaluating, verifying, analyzing, categorizing and displaying incoming messages and information, (b) the command and control function of managing objectives based on an incident action plan, (c) the command and control function of prioritizing, deploying and tracking critical Bots, (d) the command and control function of transferring commands, (e) the command and control function of determining a span of control and creating a structure to support unity of command, (f) the command and control function of establishing and maintaining a common operating procedure; (g) coordinating and/or assigning tasks to other Bots, (h) functioning as a Command Center Bot to coordinate with other Bots during Incidents and Emergencies, (i) functioning as a Change Management Bot to perform identification of dependencies, and (j) functioning as an Event Management Bot to perform problem resolution.

8. A computer system for leveraging Bots across various layers of an enterprise information technology system for reducing mean time to find problems, the computer system comprising:
one or more processors;
one or more computer readable storage devices;
program instructions stored on the one or more computer readable storage devices for execution by at least one of the one or more processors, the stored program instructions for performing a method comprising:
determining, by the one or more processors, if one or more system Bots can identify one or more issues in an enterprise information technology system;
responsive to determining that the one or more system Bots cannot identify the one or more issues, escalating, by the one or more processors, the one or more issues to one or more process Bots;
invoking, by the one or more processors, one or more MTFP computation engines from related Bots in communication with the one or more process Bots;
identifying, by the one or more processors, the one or more issues in the enterprise information technology system, and further identifying at least one relevant related Bot of the related Bots, by the invoking of the one or more MTFP computation engines from the related Bots in communication with the one or more process Bots, and commanding the at least one relevant related Bot to determine at least one resolution to the one or more issue in the enterprise information technology system, wherein the at least one relevant related Bot has been determined to be relevant to the identifying the one or more issues in the enterprise information technology system;
updating, by the one or more processors, a knowledge repository with attributes of the identified one or more issues based on attribute data of the least one relevant related Bot, wherein the one or more process Bots cognitively learn from data stored on the knowledge repository;
outputting, by a user interface, the one or more identified issues to a user; and performing, by the one or more process Bots, a process action, wherein the process action runs an independent model to identify which Bot of the related Bots can identify a certain issue per a service level agreement (SLA) and initiate a process of assigning an identification task for identifying the certain issue to the identified Bot of the related Bots, wherein the one or more system Bots continuously tracks its internal system components for its health status, wherein the method includes determining that memory usage data is available to the one or more process Bots, wherein the memory usage data includes inconsistent garbage collection, high CPU temperature, and/or missing data, and responsively to determining that memory usage data is available to the one or more process Bots performing one or more decision optimizations to dynamically formulate templates to features of a detected and/or reported issue, wherein the features of the detected and/or reported issue include (i) application speed, (ii) probability of shut down, (iii) incorrect computations, (iv) transaction speed.

9. The system of claim 8 further comprising:
identifying, by the one or more processors, one or more solutions to the identified one or more issues; wherein identifying one or more solutions comprises retrieving solution data from the knowledge repository relative to the attributes of the identified one or more issues; and
applying, by the one or more processors, the identified one or more solutions to the identified one or more issues.

10. The system of claim 9 further comprising:
initiating, by the one or more processors, a check to determine whether the applied one or more solutions are effective in correcting the one or more issues.

11. The system of claim 10 further comprising:
response to determining that the applied one or more solutions are effective in correcting the one or more issues, updating, by the one or more processors, the knowledge repository with the identified one or more solutions.

12. The system of claim 8 wherein the determining further comprises:
enabling, by the one or more processors, the one or more process Bots to perform one or more decision optimization to dynamically formulate one or more templates, in which the one or more process Bots can perform one or more decision optimization to dynamically formulate one or more templates to identify features of the detected issue.

13. The system of claim 8 wherein the one or more process Bots perform one or more of the following actions selected from the group consisting of: (a) learning through optimizing decision making by gathering, evaluating, verifying, analyzing, categorizing and displaying incoming messages and information, (b) the command and control function of managing objectives based on an incident action plan, (c) the command and control function of prioritizing, deploying and tracking critical Bots, (d) the command and control function of transferring commands, (e) the command and control function of determining a span of control and creating a structure to support unity of command, (f) the command and control function of establishing and maintaining a common operating procedure; (g) coordinating and/or assigning tasks to other Bots, (h) functioning as a Command Center Bot to coordinate with other Bots during Incidents and Emergencies, (i) functioning as a Change Management Bot to perform identification of dependencies, and (j) functioning as an Event Management Bot to perform problem resolution.

14. The system of claim 8 wherein the one or more process Bots perform each of: (a) learning through optimizing decision making by gathering, evaluating, verifying, analyzing, categorizing and displaying incoming messages and information, (b) the command and control function of managing objectives based on an incident action plan, (c) the command and control function of prioritizing, deploying and tracking critical Bots, (d) the command and control function of transferring commands, (e) the command and control function of determining a span of control and creating a structure to support unity of command, (f) the command and control function of establishing and maintaining a common operating procedure; (g) coordinating and/or assigning tasks to other Bots, (h) functioning as a Command Center Bot to coordinate with other Bots during Incidents and Emergencies, (i) functioning as a Change Management Bot to perform identification of dependencies, and (j) functioning as an Event Management Bot to perform problem resolution.

15. A computer program product for leveraging Bots across various layers of an enterprise information technology system for reducing mean time to find problems, the computer program product comprising:
   one or more computer readable storage devices and program instructions stored on the one or more computer readable storage devices, the stored program instructions for performing the method comprising:
   determining, by one or more processors, if one or more system Bots can identify one or more issues in an enterprise information technology system;
   responsive to determining that the one or more system Bots cannot identify the one or more issues, escalating, by the one or more processors, the one or more issues to one or more process Bots;
   invoking, by the one or more processors, one or more MTFP computation engines from related Bots in communication with the one or more process Bots;
   identifying, by the one or more processors, the one or more issues in the enterprise information technology system, and further identifying at least one relevant related Bot of the related Bots, by the invoking of the one or more MTFP computation engines from the related Bots in communication with the one or more process Bots, and commanding the at least one relevant related Bot to determine at least one resolution to the one or more issue in the enterprise information technology system, wherein the at least one relevant related Bot has been determined to be relevant to the identifying the one or more issues in the enterprise information technology system;
   updating, by the one or more processors, a knowledge repository with attributes of the identified one or more issues based on attribute data of the least one relevant related Bot, wherein the one or more process Bots cognitively learn from data stored on the knowledge repository;
   outputting, by a user interface, the one or more identified issues to a user; and performing, by the one or more process Bots, a process action, wherein the process action runs an independent model to identify which Bot of the related Bots can identify a certain issue per a service level agreement (SLA) and initiate a process of assigning an identification task for identifying the certain issue to the identified Bot of the related Bots, wherein the one or more system Bots continuously tracks its internal system components for its health status, wherein the method includes determining that memory usage data is available to the one or more process Bots, wherein the memory usage data includes inconsistent garbage collection, high CPU temperature, and/or missing data, and responsively to determining that memory usage data is available to the one or more process Bots performing one or more decision optimizations to dynamically formulate templates to features of a detected and/or reported issue, wherein the features of the detected and/or reported issue include (i) application speed, (ii) probability of shut down, (iii) incorrect computations, (iv) transaction speed.

16. The computer program product of claim 15 further comprising:
   identifying, by the one or more processors, one or more solutions to the identified one or more issues; wherein identifying one or more solutions comprises retrieving solution data from the knowledge repository relative to the attributes of the identified one or more issues; and
   applying, by the one or more processors, the identified one or more solutions to the identified one or more issues.

17. The computer program product of claim 16 further comprising:
   initiating, by the one or more processors, a check to determine whether the applied one or more solutions are effective in correcting the one or more issues.

18. The computer program product of claim 17 further comprising:
   response to determining that the applied one or more solutions are effective in correcting the one or more issues, updating, by the one or more processors, the knowledge repository with the identified one or more solutions.

19. The computer program product of claim 15 wherein the determining further comprises:
   enabling, by the one or more processors, the one or more process Bots to perform one or more decision optimization to dynamically formulate one or more templates, in which the one or more process Bots can perform one or more decision optimization to dynamically formulate one or more templates to identify features of the detected issue.

20. The computer program product of claim 15 wherein the one or more process Bots perform one or more of the following actions selected from the group consisting of: (a) learning through optimizing decision making by gathering, evaluating, verifying, analyzing, categorizing and displaying incoming messages and information, (b) the command and control function of managing objectives based on an incident action plan, (c) the command and control function of prioritizing, deploying and tracking critical Bots, (d) the command and control function of transferring commands, (e) the command and control function of determining a span of control and creating a structure to support unity of command, (f) the command and control function of establishing and maintaining a common operating procedure; (g) coordinating and/or assigning tasks to other Bots, (h) functioning as a Command Center Bot to coordinate with other Bots during Incidents and Emergencies, (i) functioning as a Change Management Bot to perform identification of dependencies, and (j) functioning as an Event Management Bot to perform problem resolution.

\* \* \* \* \*